Aug. 17, 1954    F. PORSCHE    2,686,455
VEHICLE INSTRUMENT PROJECTION SYSTEM WITH
VIEWING SCREEN ON STEERING WHEEL
Filed July 10, 1951    2 Sheets-Sheet 1

INVENTOR
Ferdinand Porsche
BY
Pennie, Edmonds, Morton, Barrows & Taylor
Attorneys Aug. 17, 1954     F. PORSCHE     2,686,455
VEHICLE INSTRUMENT PROJECTION SYSTEM WITH
VIEWING SCREEN ON STEERING WHEEL
Filed July 10, 1951     2 Sheets-Sheet 2

INVENTOR
Ferdinand Porsche
BY
Pennie, Edmonds, Morton, Barrows & Taylor

Patented Aug. 17, 1954

2,686,455

UNITED STATES PATENT OFFICE 2,686,455

VEHICLE INSTRUMENT PROJECTION SYSTEM WITH VIEWING SCREEN ON STEERING WHEEL

Ferdinand Porsche, Stuttgart, Germany, assignor to Porsche Konstruktionen G. m. b. H., Salzburg-Morzg, Austria Application July 10, 1951, Serial No. 235,927

Claims priority, application Austria July 22, 1950

6 Claims. (Cl. 88—24)

This invention relates to systems or means for facilitating the reading of the instruments of motor vehicles for the purpose of increasing the safety of their operation.

The instruments of motor vehicles are conventionally mounted on the dashboard in back of the steering wheel, the spokes of which interfere with the reading of the instruments. In order to avoid this difficulty, steering wheels have been made with only two spokes positioned to provide as much open space as possible, and it has also been proposed to replace the spokes of steering wheels by a transparent disc, so that the driver would be better able to see the instruments. However, the use of a transparent disc for replacing the spokes has not proved entirely satisfactory and in some cases the reading of the instruments is impeded because the disc becomes opaque or smeared because of the accumulation of dirt and mist.

The primary object, therefore, of the present invention is to provide an improved system or means for facilitating the reading of the instruments of a motor vehicle which avoids the difficulties referred to above.

According to the invention, the improved system or means comprises a projection screen which is located nearer to the eyes of the vehicle driver than that of the instruments normally carried in the instrument panel or dashboard of the vehicle, and means located in the dashboard and operatively associated with one or more of the instruments for projecting the readings of such instrument or instruments onto the projection screen.

In an advantageous construction, the steering wheel of the vehicle is provided with an annular transparent or translucent disc of material which partially or completely replaces the conventional spokes of the steering wheel. The instrument readings are projected onto this transparent or translucent part of the steering wheel directly in front of the driver of the vehicle so that, regardless of the position to which the wheel is rotated, the readings are directly visible at close range to the driver.

Where a disc of transparent material is employed, such material is dulled, roughed, or etched to provide an annular band constituting the screen onto which the readings of the instruments are projected. The readings of the instruments are, therefore, brought nearer to the eyes of the driver thereby making them more visible than under normal conditions. These readings remain readily visible to the driver even if the transparent material of the steering wheel becomes clouded or dirty. Instead of using a transparent disc, or a partly transparent disc, a disc of translucent material may be employed.

The means for projecting the readings onto the projection screen comprises an optical unit or system mounted in front of the instrument, or the numbers or other indicia to be projected onto the screen. In most cases, the dashboard instruments of motor vehicles are arranged so that their readings are readily projected merely by installing the optical system therefor between the instrument or readings to be projected and the screen.

In a construction according to the invention, there is absolutely no obstacle between the driver's eyes and the instrument readings projected onto the screen. This arrangement, therefore, contributes to the safe driving of the vehicle. The cost of providing the system of the invention is small, since, except for the optical unit, most instruments are arranged directly behind the steering wheel from which the readings may be projected directly onto the projection screen provided as a part of the steering wheel.

Other features, objects, and advantages of the improved system and combination of the present invention will be apparent to those skilled in the art from the following more detailed description thereof, taken in connection with the accompanying drawings forming a part of this application and illustrating an embodiment of the invention.

Figure 1:
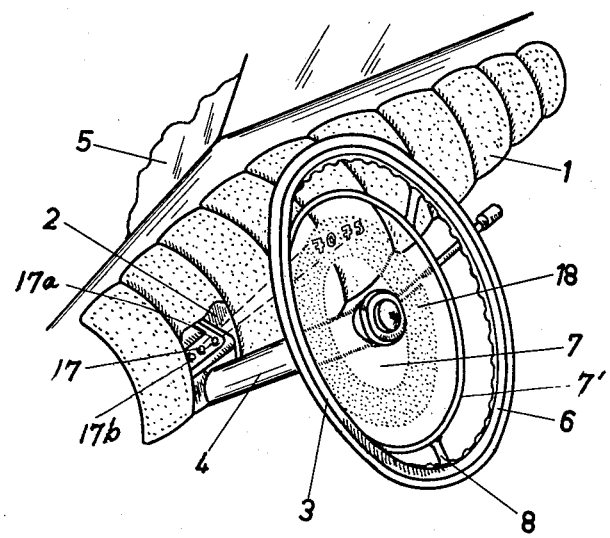
Fig. 1 is a broken perspective view of the dashboard and steering wheel of a motor vehicle employing the features of the present invention.
Figure 3:
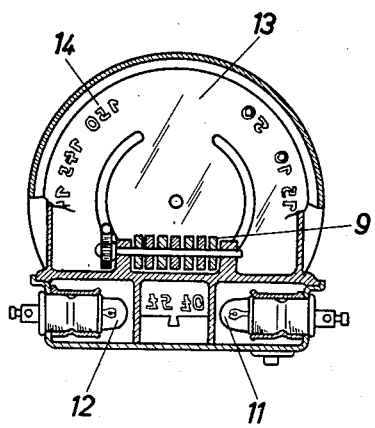
Fig. 3 is a sectional view taken on the line III—III of Fig. 2.
Figure 2:
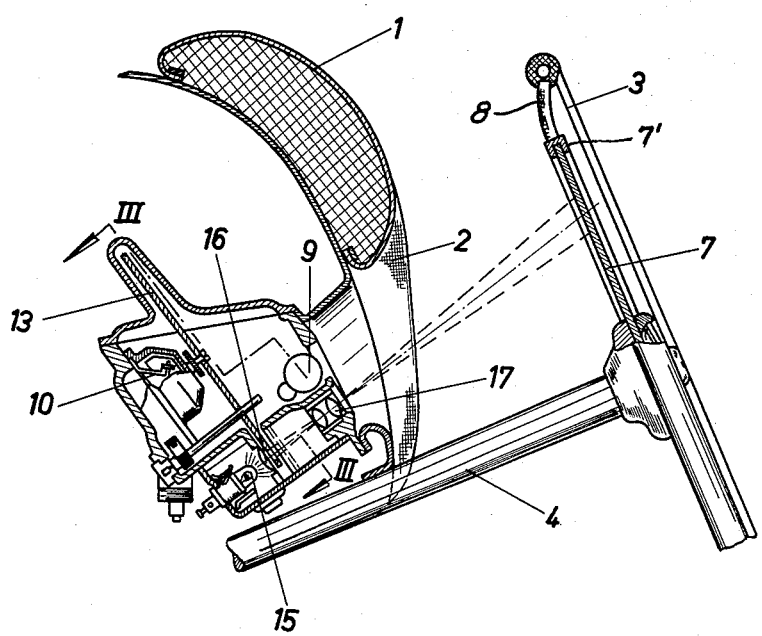
Fig. 2 is a broken vertical sectional view through the dashboard at the position of the instruments and through the steering wheel shown in Fig. 1, illustrating the features of the invention in connection with one conventional form of instrument arrangement.

Referring to Figs. 1 to 3 of the drawings, a dashboard 1 of a motor vehicle is provided with one or more openings 2, behind which the vehicle instruments are mounted, the opening or openings 2 being located in back of a steering wheel 3 carried on a steering shaft 4. The windshield of the vehicle is indicated at 5 in Fig. 1. According to one form of the invention, the steering wheel as shown in Figs. 1 and 2 is comprised of a rim 6 and a transparent disc 7 mounted on the shaft 4. The periphery of the disc 7 carries a channel member 7' of metal or other suitable material carrying radially extending short spokes 8, which are attached to and support the rim 6 in steering position. According to the invention, the use of the spokes 8 may be avoided by extending the disc 7 out to the rim 6, in which case the disc will be provided with cut-outs for insertion of the driver's fingers.

The customary instruments of the motor vehicle are located in or behind the aperture, or apertures 2 in the dashboard, such instruments in the present instance comprising a mileage or kilometer counter 9, a speedometer 10, a battery charge control or indicator (not shown) having a lamp 11, and an oil pressure control (not shown) having an indicator lamp 12. The particular type of speedometer illustrated includes a disc 13 carrying around its periphery the speed numerals 14. The entire disc 13 or only the portion carrying the numerals may be transparent, or the numerals only may be made transparent, for example, by punching out the numerals in the disc.

A light 15 is mounted under the periphery of the disc 13 at such a distance from the axis of the disc that the light rays hit the speed numerals so that they are readily visible or readily projected. The arrangement for the projection of the speedometer readings includes a diaphragm 16, which may be of any desired color, located between the light source 15 and the disc 13. The speedometer illustrated is of conventional construction, but in any case, the numerals must be susceptible of projection onto the disc 7.

The projection of the numerals 14 from the disc 13 is accomplished by providing an optical system or unit 17 in front of the disc 13 in line with the light source 15. The unit 17, as shown in Fig. 2 comprises a pair of spaced lenses in series, but any suitable optical unit may be employed. The disc 7, as shown in Fig. 1, includes an annular band 18, which is roughed, etched, or otherwise made dull, so that the numerals projected by the optical system 17 are made visible on the band 18 of the disc 7. In the particular example shown in Fig. 1, a speed reading on the disc 13 of between 70 and 75 kilometers, per hour, is projected onto the dulled ring or screen 18.

In the construction and arrangement as shown and described, the numerals of the speedometer are brought much nearer to the driver's eyes than they otherwise would be and may be enlarged so that they are readily visible to the driver. It will be noted that the speedometer numerals are projected onto the screen 18 where they are unobstructed by any part of the steering wheel regardless of the position to which it has been rotated, thereby greatly increasing the safety of driving.

Additional optical systems may be provided on both sides of the optical system 17, as indicated generally at 17a and 17b in Fig. 1. For example, light rays from the battery charging control lamp 11, made green by a colored filter disc or diaphragm, may be projected by the optical system 17a onto the screen 18 to one side of the speed numerals, while light rays from the oil pressure control lamp 12, made red by a colored filter disc or diaphragm, can be similarly projected onto the screen 18 on the other side of the speed numerals, by the optical system 17b.

In this manner all or at least the important instruments of the motor vehicle can be projected onto the screen carried by the steering wheel and read directly without obstruction by the driver.

In the particular illustrative embodiment shown in Figs. 1 to 3, the figures on the mileage or kilometer counter 9 may be read directly off the dashboard through the transparent part of the disc 7, in the usual manner. If desired, however, an optical system may be provided for reading this counter although it is not usually essential to the operation of the vehicle for the driver to know the mileage reading while the vehicle is moving.

Figure 4:
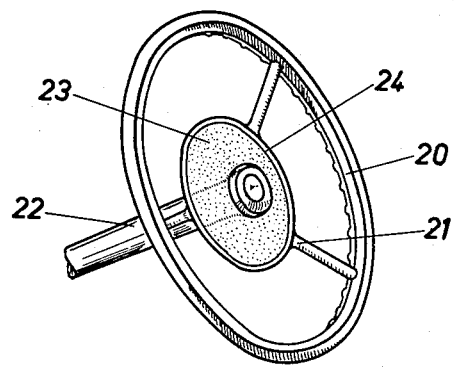
Fig. 4 is a perspective view of a modified form of steering wheel construction.

Fig. 4 of the drawings illustrate a modified form of steering wheel construction in which the steering wheel rim 20 is carried on radially-extending spokes 21 which are connected to a translucent or dull disc projection screen 23 mounted on the steering shaft 22. The disc 23 is smaller than that illustrated in Fig. 1 and surrounds the shaft 22. The disc may be reinforced as, for example, by a metal ring 24 to which the spokes 21 are fastened. The projection of the instrument readings from the instruments carried by the dashboard is accomplished in the same manner as that described above in connection with Figs. 1 to 3 of the drawings, the light beam or beams associated with the particular instruments projecting the readings through the optical units directly onto the disc 23, which gives the driver an unobstructed reading of the motor vehicle instruments. The smaller screen shown in Fig. 4 has the advantage that it may be used only in connection with the more important instruments while the less important instruments can be read in the customary manner through the steering wheel outside the ring 24.

The use of a projection screen carried by the steering wheel of a vehicle in conjunction with the optical system brings the instrument readings close to the eyes of the driver and at the same time makes them much more conspicuous to the driver than they normally are, thereby greatly improving the safety of the operation of the vehicle.

The forms of the invention shown in the drawings and described above are for purposes of illustration only and it should be understood that the invention is not restricted to the particular constructions and arrangements shown.

What I claim is:

1. In an instrument projection system for projecting the indications of the instruments mounted in the instrument panel of a motor vehicle upon a viewing screen for viewing by the driver of the vehicle, the motor vehicle including a steering wheel mounted rearwardly of the instruments on the dashboard of the motor vehicle, the improvement comprising a steering wheel having as a part of its structure a translucent projection screen portion concentrically positioned substantially parallel to the rim portion of said wheel whereby the view of said screen by the driver is unobstructed by any other part of the steering wheel structure at all positions of rotation of the steering wheel, and means for projecting the readings of at least one of the instruments rearwardly from the instrument panel onto said translucent projection screen portion of the steering wheel where they are readily and freely visible to the driver at close range.

2. A system as claimed in claim 1, in which said steering wheel includes a rim, and an annular translucent portion located inwardly of and spaced from said rim and comprising a part of the structure of the steering wheel.

3. A system as claimed in claim 1, in which the steering wheel includes a rim, and an annular disc located inwardly of the rim and comprising a part of the structure of the steering wheel, said annular disc including an annular transparent portion and an annular translucent portion the latter of which constitutes said translucent projection screen portion of the steering wheel.

4. In an instrument projection system for projecting the indications of the instrument mounted in the instrument panel of a motor vehicle upon a viewing screen for viewing by the driver of the vehicle, the motor vehicle including a steering wheel mounted rearwardly of the instruments on the dashboard of the motor vehicle, the improvement comprising a steering wheel having as a part of its structure a translucent projection screen portion concentrically positioned substantially parallel to the rim portion of said wheel whereby the view of said screen by the driver is unobstructed by any other part of the steering wheel structure at all positions of rotation of the steering wheel, and means for projecting the readings of at least one of the instruments rearwardly from the instrument panel onto said translucent projection screen portion on the steering wheel where they are readily and freely visible to the driver at close range, said means including a light source operatively associated with said one instrument, and an optical system including a lens for collecting the light rays from said instrument and for projecting them onto the translucent projection screen portion of the steering wheel.

5. In an instrument projection system for projecting the indications of the instruments mounted in the instrument panel of a motor vehicle upon a viewing screen for viewing by the driver of the vehicle, the motor vehicle including a steering wheel mounted rearwardly of the instruments on the dashboard of the motor vehicle, the improvement comprising a steering wheel having a rim and including as a part of its structure an annular disc located inwardly and spaced from said rim, at least a part of said disc being of translucent material and providing a projection screen concentrically positioned substantially parallel to the rim of the wheel whereby the view of said screen by the driver is unobstructed by any other part of the steering wheel structure at all positions of rotation of the steering wheel, spokes extending from said disc to the rim of the steering wheel for supporting said rim, and means for projecting the readings of at least one of the instruments rearwardly from the instrument panel onto said translucent projection screen portion of said annular disc where they are readily and freely visible to the driver at close range.

6. A system as defined by claim 5, in which said annular disc includes an annular transparent portion and an annular translucent portion the latter of which constitutes said translucent projection screen portion of the disc.

References Cited in the file of this patent

UNITED STATES PATENTS

| Number | Name | Date |
|---|---|---|
| 1,288,377 | Bryan | Dec. 17, 1918 |
| 1,572,671 | Myers | Feb. 9, 1926 |
| 1,684,682 | Prettyman | Sept. 18, 1928 |
| 1,757,493 | Wharam | May 6, 1930 |
| 1,813,003 | Von Klein | July 7, 1931 |
| 1,871,877 | Buckman | Aug. 16, 1932 |
| 2,191,045 | Slayton | Feb. 20, 1940 |
| 2,264,044 | Lee | Nov. 25, 1941 |
| 2,426,184 | Deloraine et al. | Aug. 26, 1947 |